Patented July 13, 1954

2,683,713

UNITED STATES PATENT OFFICE 2,683,713

SUBSTITUTED BENZYLISOQUINOLINES

Edwin R. Shepard, Indianapolis, Ind., assignor to Eli Lilly and Company, Indianapolis, Ind., a corporation of Indiana No Drawing. Application February 16, 1951, Serial No. 211,441

8 Claims. (Cl. 260—286)

This invention relates to benzylisoquinolines and more particularly to alkoxy substituted benzylisoquinolines and their acid addition salts.

The basic nucleus of the compounds of this invention is the benzylisoquinoline nucleus, which may be represented by the following structural formula:

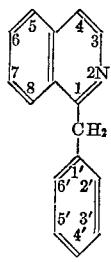

Compounds which are included within the scope of this invention and which contain the basic nucleus as represented above are 6-methoxy-7-ethoxy - 3-methyl-1- (3'-ethoxy-4'-methoxy-benzyl) - isoquinoline; 6,7-dimethoxy-1 - (4'-isopropylbenzyl) - isoquinoline; and 6-ethoxy-7-methoxy - 3-methyl-1 - (3',4'-diethoxy-benzyl) - isoquinoline.

The new benzylisoquinolines when in basic form are only slightly soluble in water, but are soluble in the common organic solvents. Because of the basic properties of the nitrogen atom contained in the isoquinoline nucleus, the new benzylisoquinoline bases form acid addition salts; and such salts are, in general, crystalline compounds having a greater solubility in water and a lesser solubility in organic solvents than the parent isoquinoline bases.

The novel substituted benzylisoquinolines cause pronounced relaxation of smooth muscle in the animal organism and are particularly adapted for therapeutic use as antispasmodics.

Broadly speaking, the compounds of the present invention are prepared in the following manner: An alkoxyphenethylamine is reacted with a suitably substituted phenylacetic acid to form the corresponding substituted phenylacetic acid derivative of the alkoxyphenethylamine. This compound is treated with phosphorous oxychloride to form, by ring closure, a substituted benzyldihydroisoquinoline which is dehydrogenated with palladium to form the desired substituted alkoxybenzylisoquinoline. The following series of equations shows the preparation of 6-methoxy - 7-ethoxy-3-methyl-1 - (3'-ethoxy-4'-methoxybenzyl) isoquinoline, and illustrates the course of the reactions involved in the synthesis.

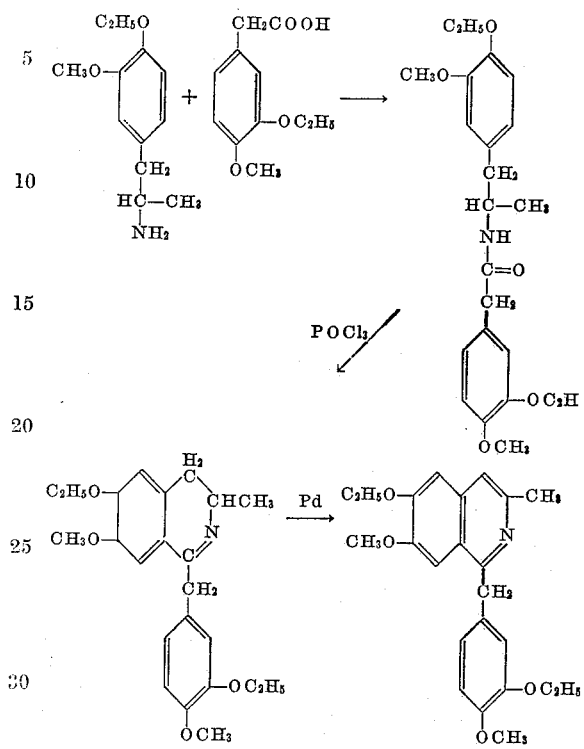

Acid addition salts of the novel substituted benzylisoquinoline bases can readily be prepared by methods known to the art. According to one method of preparation, stoichiometrically equivalent amounts of a base and the selected mineral or organic acid are reacted in anhydrous ethanol solution, and the solvent is evaporated to obtain the acid addition salt in dry form. The preferred acid addition salts of the benzylisoquinolines of this invention are the non-toxic, pharmaceutically useful acid addition salts. By the term "non-toxic, pharmaceutically useful salts" is meant those salts which are not substantially greater in toxicity than the corresponding bases, and which are suitable for incorporation into pharmaceutical preparations because of their desirable solubility and/or other properties. Illustrative examples of such acid addition salts are the hydrochloride nitrate, maleate, phosphate, acetate, citrate, hydrobromide, hydroiodide, and sulfate salts, and the like.

The following examples will more specifically illustrate the preparation of the novel compounds and their salts.

EXAMPLE 1

*6-ethoxy-7-methoxy-3-methyl-1-(3',4'-diethoxybenzyl) isoquinoline*

A mixture of 148 g. of 3-ethoxy-4-methoxybenzaldehyde, 61.5 g. of nitroethane, and 8 cc. of n-butylamine was stored in the dark for two weeks. The mixture was then taken up in 400 cc. of alcohol and chilled, whereupon a solid, comprising the 1-(3'-ethoxy-4'-methoxy) phenyl-2-nitropropene formed in the reaction, separated. It was filtered off and washed with 50 percent alcohol.

1-(3'-ethoxy-4'-methoxy)-phenyl - 2 - nitro-1-propene melted at about 80.5–81.5° C. Analysis showed the presence of 60.64 percent carbon and 6.25 percent hydrogen as compared with the calculated amounts of 60.75 percent carbon and 6.37 percent hydrogen.

95 cc. of concentrated hydrochloric acid were added during the course of 2 hours to a mixture of 260 g. of iron powder, 490 cc. of water, 0.65 g. of ferric chloride and 153.5 g. of 1-(3'-ethoxy-4'-methoxy)-phenyl-2-nitro - 1 - propene while stirring under gentle refluxing. The stirring and refluxing were continued for 6 hours, and the resulting mixture was slurried with about 500 cc. of benzene and filtered using a filter aid. The filter cake was washed with benzene, and the combined filtrate and benzene washings were washed with dilute hydrochloric acid, dried, and subjected to fractional distillation to recover the 1-(3'-ethoxy-4'-methoxyphenyl) - propanone-2 formed in the reaction.

1 - (3'-ethoxy-4'-methoxyphenyl)-propanone-2 boiled at 152–154° C. at a pressure of 6 mm. of mercury. Analysis showed the presence of 69.01 percent carbon and 7.99 percent hydrogen as compared with the calculated amounts of 69.21 percent carbon and 7.74 percent nitrogen.

A mixture of 108.5 g. of 1-(3'-ethoxy-4'-methoxyphenyl)-propanone-2, 90 cc. of water, and 48 g. of hydroxylamine hydrochloride was stirred while a saturated aqueous solution containing 35 g. of sodium carbonate was added. 100 cc. of alcohol were added to the reaction mixture and stirring was continued for two hours. The reaction mixture was then diluted with an equal amount of water and extracted with three 200 cc. portions of ether. The combined ether extracts were washed with water, dried over anhydrous magnesium sulfate and the ether was distilled. The residue, comprising the 1-(3'-ethoxy-4'-methoxyphenyl)-propanone-2-oxime formed in the reaction, was purified by fractional distillation in vacuo.

1-(3'-ethoxy-4'-methoxyphenyl) - propanone-2-oxime boiled at 165–175° C., at a pressure of 0.5 mm. of mercury. Analysis showed the presence of 6.20 percent nitrogen as compared with the calculated amount of 6.27 percent.

A solution of 104 g. of 1-(3'-ethoxy-4'-methoxyphenyl)-propanone-2-oxime in 100 cc. of absolute ethanol and 50 cc. of liquid ammonia was reduced with hydrogen and Raney nickel catalyst, at a temperature of 110–130° C. and about 150 atmospheres pressure. The reduction was complete in about ½ hour. The reaction mixture was filtered to remove the catalyst, and fractionally distilled in vacuo to recover the 1-(3'-ethoxy - 4' - methoxyphenyl) - isopropyl amine formed in the reaction.

1-(3'-ethoxy - 4' - methoxyphenyl)-isopropyl-amine boiled at 163–166° C. at a pressure of 15 mm. of mercury. Analysis showed the presence of 6.79 percent nitrogen as compared with the calculated amount of 6.69 percent.

A mixture of 22.0 g. of 1-(3'-ethoxy-4'-methoxyphenyl)-isopropylamine and 23.6 g. of 3,4-diethoxyphenylacetic acid was heated at about 190–200° C., until there was no further evolution of water. The residue, comprising N-[1-(3'-ethoxy-4'-methoxyphenyl)-isopropyl] - 3,4 - diethoxyphenylacetamide, was crystallized twice from dilute methanol.

N-[1-(3'-ethoxy-4'-methoxyphenyl) - isopropyl]-3,4-diethoxyphenylacetamide melted at 118–119° C. Analysis showed the presence of 69.00 percent carbon and 7.98 percent hydrogen as compared with the calculated amounts of 69.36 percent carbon and 8.01 percent nitrogen.

A mixture of 30.5 g. of N-[1-(3'-ethoxy-4'-methoxyphenyl)-isopropyl]-3,4-diethoxyphenylacetamide, 220 cc. of thiophene-free benzene, and 6 cc. of phosphorus oxychloride was refluxed for 2½ hours, cooled, and shaken with a solution of 12 g. of sodium hydroxide in 60 cc. of water. The aqueous layer was removed, the benzene solution washed with water, and the benzene solution was distilled for a sufficient length of time to remove all of the water present. 150 cc. of decaline were added to the benzene solution and the mixture was distilled until its temperature reached 180° C. All operations up to this point were carried out in an atmosphere of nitrogen. A suspension of 1 g. of 5 percent palladium on charcoal in 50 cc. of decalin was added, and the 6-ethoxy-7-methoxy-3-methyl-1-(3',4'-diethoxybenzyl)-dihydroisoquinoline formed by the ring closure with phosphorus oxychloride was dehydrogenated by refluxing for 5 hours. The hot solution was filtered to remove the catalyst and 200 cc. of petroleum ether were added to precipitate the 6-ethoxy-7-methoxy-3-methyl-1-(3'4'-diethoxybenzyl)-isoquinoline formed by dehydrogenation. The precipitated solid was filtered, washed with petroleum ether and dried at 80° C. in vacuo to remove residual decalin. The dried solid was dissolved in 500 cc. of hot 1:1 ethanol-water mixture, crystallized by cooling in a refrigerator and recrystallized from aqueous methanol.

6-ethoxy-7-methoxy - 3 - methyl-1-(3',4'-diethoxybenzyl)-isoquinoline melted at 116–117° C. Analysis showed the presence of 72.88 percent carbon and 7.42 percent hydrogen as compared with the calculated amounts of 72.88 percent carbon and 7.39 percent hydrogen.

EXAMPLE 2

*6-methoxy-7-ethoxy-3-methyl-1-(3-ethoxy-4-methoxybenzyl) isoquinoline*

A mixture of 360 g. of 4'-ethoxy-3'-methoxybenzaldehyde, 150 cc. of nitroethane and 20 cc. of butylamine was stored two weeks in the dark. The resulting product, comprising the 1-(4'-ethoxy-3'-methoxyphenyl)-2-nitro - 1 - propene formed on standing, was recrystallized from alcohol for purification.

1-(4'-ethoxy-3'-methoxyphenyl) - 2 - nitro-1-propene melted at about 111.5–112° C. Analysis showed the presence of 60.51 percent carbon and 6.21 percent hydrogen, as compared with the calculated amounts of 60.75 percent carbon and 6.37 percent hydrogen.

A mixture of 354.7 g. of 1-(4'-ethoxy-3'-methoxyphenyl)-2-nitro-1-propene, 600 g. of iron filings, 1.5 g. of ferric chloride and 1130 cc. of water was gently refluxed and stirred, and 220 cc. of concentrated hydrochloric acid were added to the mixture over a period of about two hours. Stirring and refluxing were continued for about 8 hours. The reaction mixture was slurried with about 1 liter of benzene and the mixture was filtered using a filter aid. The filter cake was washed with benzene, and the combined filtrate and benzene washings were washed with dilute hydrochloric acid and with water, and dried. The benzene solution was fractionally distilled to recover the 1-(4'-ethoxy-3'-methoxyphenyl)-propanone-2 which was formed in the reaction.

1 - (4' - ethoxy - 3' - methoxyphenyl) - propanone-2 boiled at about 123–139° C. at a pressure of 0.15 mm. of mercury. Analysis showed the presence of 69.05 percent carbon and 7.57 percent hydrogen, as compared with the calculated amounts of 69.21 percent carbon and 7.74 percent hydrogen.

A mixture of 239.5 g. of 1-(4'-ethoxy-3'-methoxyphenyl)-propanone-2, 190 cc. of water, and 105 g. of hydroxylamine hydrochloride was stirred, and a solution of 77 g. of sodium carbonate in a minimum amount of water was added. The mixture was stirred overnight, and the suspension of 1-(4'-ethoxy-3'-methoxyphenyl)-propanone-2-oxime which formed was filtered. The precipitate was recrystallized twice from a 1:1 hexane-ethyl acetate mixture.

1 - (4'-ethoxy-3'-methoxyphenyl)-propanone-2-oxime melted at about 82–84° C. Analysis showed the presence of 6.24 percent nitrogen as compared with the calculated amount of 6.27 percent.

A mixture of 190 g. of 1-(4'-ethoxy-3'-methoxyphenyl)-propanone-2-oxime, 100 cc. of alcohol, 50 cc. of liquid ammonia and 5 g. of Raney nickel catalyst was heated to 120° C. under a pressure of 150 atmospheres of hydrogen. Reduction was completed in ½ hour, and the 1-(4' - ethoxy - 3'-methoxyphenyl)-isopropylamine which formed was purified by fractional distillation in vacuo, after filtration of the solution to remove the catalyst.

1 - (4' - ethoxy-3'-methoxyphenyl)-isopropylamine boiled at 162–165° C. at a pressure of 14 mm. of mercury. Analysis showed the presence of 6.60 percent nitrogen as compared with the calculated amount of 6.69 percent.

A mixture of 31.4 g. of 1-(4'-ethoxy-3'-methoxyphenyl)-isopropylamine and 31.5 g. of 3-ethoxy-4-methoxyphenylacetic acid was heated at 190–200° C. until evolution of water was completed. The product, comprising N-[1-(4'-ethoxy - 3' - methoxyphenyl)-isopropyl]-3-ethoxy-4-methoxyphenylacetamide, was crystallized twice from dilute ethanol and melted at about 124–125° C. Analysis showed the presence of 68.55 percent carbon and 7.61 percent hydrogen as compared with the calculated amounts of 68.79 percent carbon and 7.78 percent hydrogen.

A mixture of 46 g. of N-[1-(4'-ethoxy-3'-methoxyphenyl) - isopropyl]-3-ethoxy-4-methoxyphenylacetamide, 170 cc. of thiophene-free benzene and 8 cc. of phosphorus oxychloride was treated according to the procedure of Example 1 to produce 6-methoxy-7-ethoxy-3-methyl-1-(3' - ethoxy-4'-methoxybenzyl)-dihydroisoquinoline, which was dehydrogenated with palladium on carbon following the procedure of Example 1.

6 - methoxy - 7 - ethoxy-3-methyl-(3-ethoxy-4'-methoxybenzyl)-isoquinoline melted at about 122–124° C. Analysis showed the presence of 72.53 percent carbon and 7.42 percent hydrogen as compared with the calculated amounts of 72.42 percent carbon and 7.14 percent nitrogen.

EXAMPLE 3

6 - methoxy - 7 - ethoxy - 3 - methyl - 1-(3'-ethoxy - 4' - methoxybenzyl) - isoquinoline hydrochloride 10 g. of 6-methoxy-7-ethoxy-3-methyl-1-(3'-ethoxy - 4' - methoxybenzyl) - isoquinoline were dissolved in 100 cc. of anhydrous ethanol, and 3 g. of anhydrous hydrogen chloride were added thereto. The hydrochloride salt which formed was precipitated by the addition of 300 cc. of anhydrous ether. The precipitate was filtered off and crystallized from absolute ethanol-anhydrous ether mixture.

6 - methoxy - 7 - ethoxy - 3 - methyl - 1 - (3'-ethoxy - 4' - methoxybenzyl)-isoquinoline hydrochloride melted at about 221–22° C. Analysis showed the presence of 65.83 percent carbon, 6.94 percent hydrogen and 3.25 percent nitrogen as compared with the calculated amounts of 66.09 percent carbon, 6.76 percent hydrogen and 3.35 percent nitrogen.

EXAMPLE 4

6,7 - dimethoxy - 1 - (4' - isopropylbenzyl) - isoquinoline hydrochloride

A mixture of 35.6 g. (0.2 mol) of p-isopropylphenylacetic acid and 39.9 g. (0.22 mol) of homoveratrylamine was heated in an open flask at 145° C. for 45 minutes. The hot reaction mixture was dissolved in 150 cc. of benzene and crystallization was induced by the addition of hexane. The crystalline precipitate, comprising N - homoveratryl - p - isopropylphenylacetamide formed in the reaction, was purified by recrystallization from aqueous methanol and by repeated recrystallization from benzene-hexane solution.

N - homoveratryl - p-isopropylphenylacetamide melted at about 93–93.5° C. Analysis showed the presence of 73.61 percent carbon and 7.99 percent nitrogen, as compared with the calculated amounts of 73.87 percent carbon and 7.97 percent hydrogen.

A mixture of 50 g. of N-homoveratryl-p-isopropylphenyl-acetamide, 200 cc. of thiophene-free benzene, and 10 cc. of phosphorus oxychloride was refluxed for two hours. The reaction mixture was cooled and shaken with a solution composed of 15 g. of sodium hydroxide in 60 cc. of water. The aqueous layer was removed, and the benzene solution containing the 6,7-dimethoxy - 1 - (4' - isopropylbenzyl) - dihydroisoquinoline formed in the reaction was washed with water. The benzene solution was distilled for a time sufficient to remove the water contained therein, 150 cc. of decalin were added, and the mixture was distilled until its temperature reached 180° C. The preceding operations were all carried out under an atmosphere of nitrogen. A suspension of 1½ g. of 5 percent palladium on carbon and 50 cc. of decalin was then added, and the mixture was refluxed for 5 hours to cause the dehydrogenation of the dihydroisoquinoline to isoquinoline. The hot solution was filtered to remove the catalyst, diluted with an equal volume of hexane, and washed with 150 cc. of 5 percent sodium hydroxide solution. The alkali-washed decalin-hexane solution was then extracted with three 100 cc. portions of 5 percent aqueous phosphoric acid. The combined acid extracts were washed with ether and then made alkaline with an excess of sodium hydroxide. An oil, consisting of 6,7-dimethoxy-1-(4'-isopropylbenzyl)-isoquinoline, separated and was extracted from the alkaline mixture with successive 150 cc. portions of benzene and ether. The combined benzene and ether extracts were evaporated in vacuo to remove the solvents, and 50 cc. of absolute ethanol were added to the residue. 10 g. of dry hydrogen chloride were introduced into the ethanol solution, and the 6,7 - dimethoxy - 1 - (4' - isopropylbenzyl) - isoquinoline hydrochloride which formed was precipitated by the addition of an excess of ether. The precipitate was filtered and purified by recrystallization from a mixture of absolute alcohol, acetone and ether.

6,7 - dimethoxy - 1 - (4' - isopropylbenzyl)- isoquinoline hydrochloride melted at about 182–185° C. Analysis showed the presence of 69.84 percent carbon and 7.35 percent hydrogen as compared with 69.37 percent carbon and 7.14 percent hydrogen, calculated for the hydrochloride salt containing ½ molecule of alcohol of crystallization.

EXAMPLE 5

*Salts of 6-ethoxy-7-methoxy-3-methyl-1-(3',4'-diethoxybenzyl)-isoquinoline*

A solution of 10 g. (0.027 mol) of 6-ethoxy-7-methoxy - 3 - methyl - 1 - (3',4' - diethoxybenzyl)-isoquinoline in 100 cc. of absolute ethanol was treated with 0.93 g. (0.027 mol) of anhydrous hydrogen chloride. To the resulting solution were added 350 cc. of anhydrous ether. A precipitate composed of 6-ethoxy-7-methoxy-3-methyl - 1 - (3',4' - diethoxybenzyl) - isoquinoline hydrochloride formed and was recrystallized from absolute ethanol by the addition of 4 volumes of ether.

6 - ethoxy - 7 - methoxy - 3 - methyl - 1 - (3',4' - diethoxybenzyl) - isoquinoline hydrochloride melted at about 200–201° C. Analysis showed the presence of 3.28 percent nitrogen as compared with the calculated amount of 3.24 percent.

The nitrate, maleate, phosphate, acetate, sulfate, citrate, and hydrobromide salts of 6-ethoxy-7 - methoxy - 3 - methyl - 1 - (3',4' - diethoxybenzyl)-isoquinoline hydrochloride are formed in the same manner, except that the equivalent amounts of nitric, malic, phosphoric, acetic, sulfuric, citric, and hydrobromic acids are used.

I claim:

1. A compound of the group consisting of 6-methoxy - 7 - ethoxy - 3 - methyl - 1 - (3' - ethoxy - 4' - methoxybenzyl) - isoquinoline, 6 - ethoxy - 7 - methoxy - 3 - methyl - 1 - (3',4' - diethoxybenzyl) - isoquinoline, 6,7 - dimethoxy - 1 - (4'-isopropylbenzyl)-isoquinoline, and their acid addition salts.

2. 6-methoxy - 7 - ethoxy - 3 - methyl - 1 -1 (3'-ethoxy-4'-methoxybenzyl)-isoquinoline.

3. Acid addition salts of 6-methoxy-7-ethoxy-3 - methyl - 1 - (3' - ethoxy - 4' - methoxybenzyl)-isoquinoline.

4. 6 - methoxy - 7 - ethoxy - 3 - methyl - 1- (3'-ethoxy-4'-methoxybenzyl)-isoquinoline hydrochloride.

5. 6 - ethoxy - 7 - methoxy - 3 - methyl - 1- (3',4'-diethoxybenzyl)-isoquinoline.

6. Acid addition salts of 6-ethoxy-7-methoxy-3-methyl-1-(3',4'-diethoxybenzyl)-isoquinoline.

7. Acid addition salts of 6,7-dimethoxy-1-(4'-isopropylbenzyl)-isoquinoline.

8. 6,7 - dimethoxy - 1 - (4' - isopropylbenzyl)-isoquinoline hydrochloride.

References Cited in the file of this patent

UNITED STATES PATENTS

| Number | Name | Date |
|---|---|---|
| 1,941,647 | Wolfes | Jan. 2, 1934 |

FOREIGN PATENTS

| Number | Country | Date |
|---|---|---|
| 574,656 | Germany | Apr. 19, 1933 |

OTHER REFERENCES

Bruckner et al.: J. Chem. Soc. (London), 1948, pp. 885–890.